April 23, 1957     W. DE BACK ET AL     2,789,603

FRUIT PREPARATION MACHINE

Filed June 10, 1955     6 Sheets—Sheet 1

INVENTORS
WILLIAM DE BACK
SYLVIO PUCCINELLI

BY Hans G. Hoffmeister
ATTORNEY

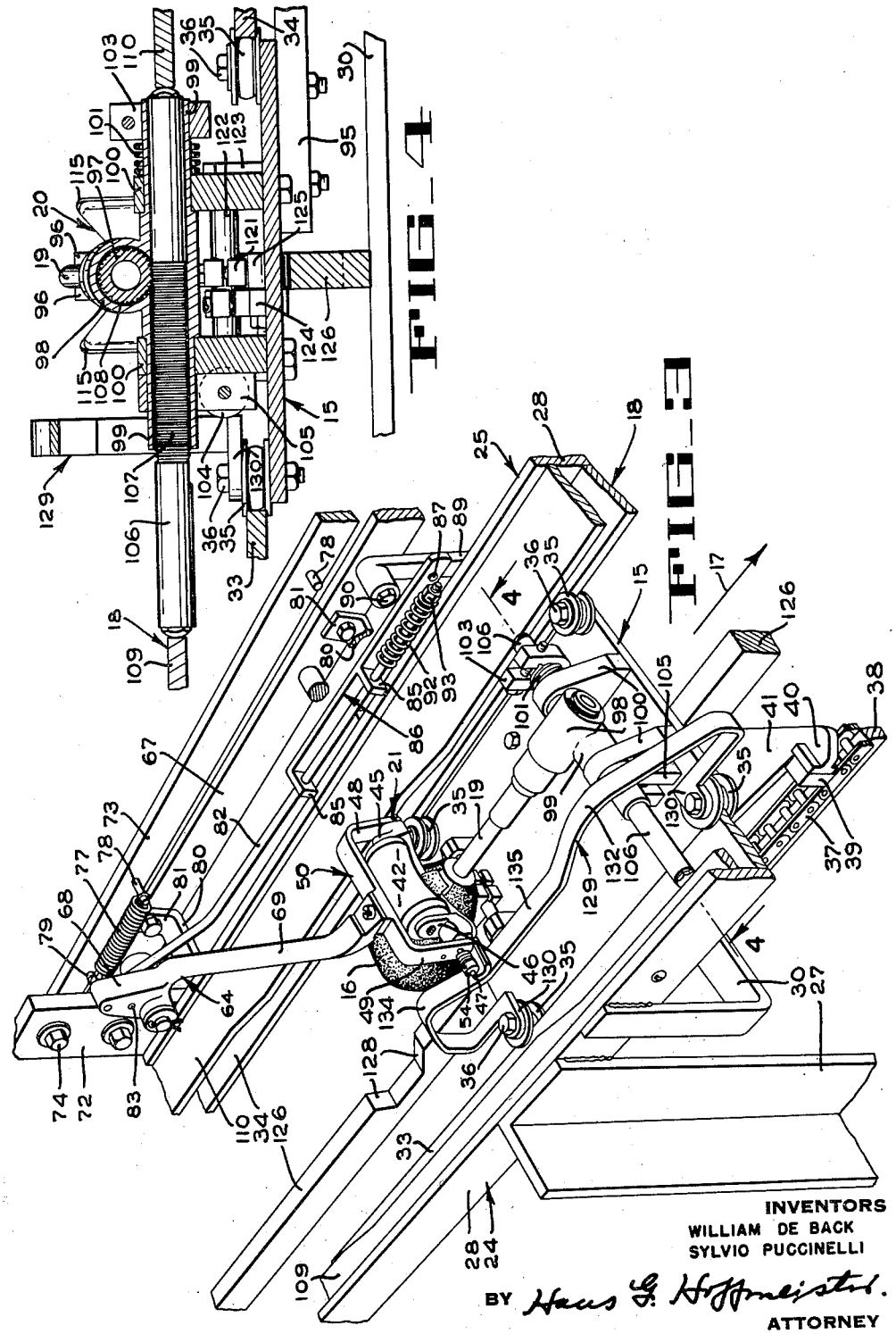

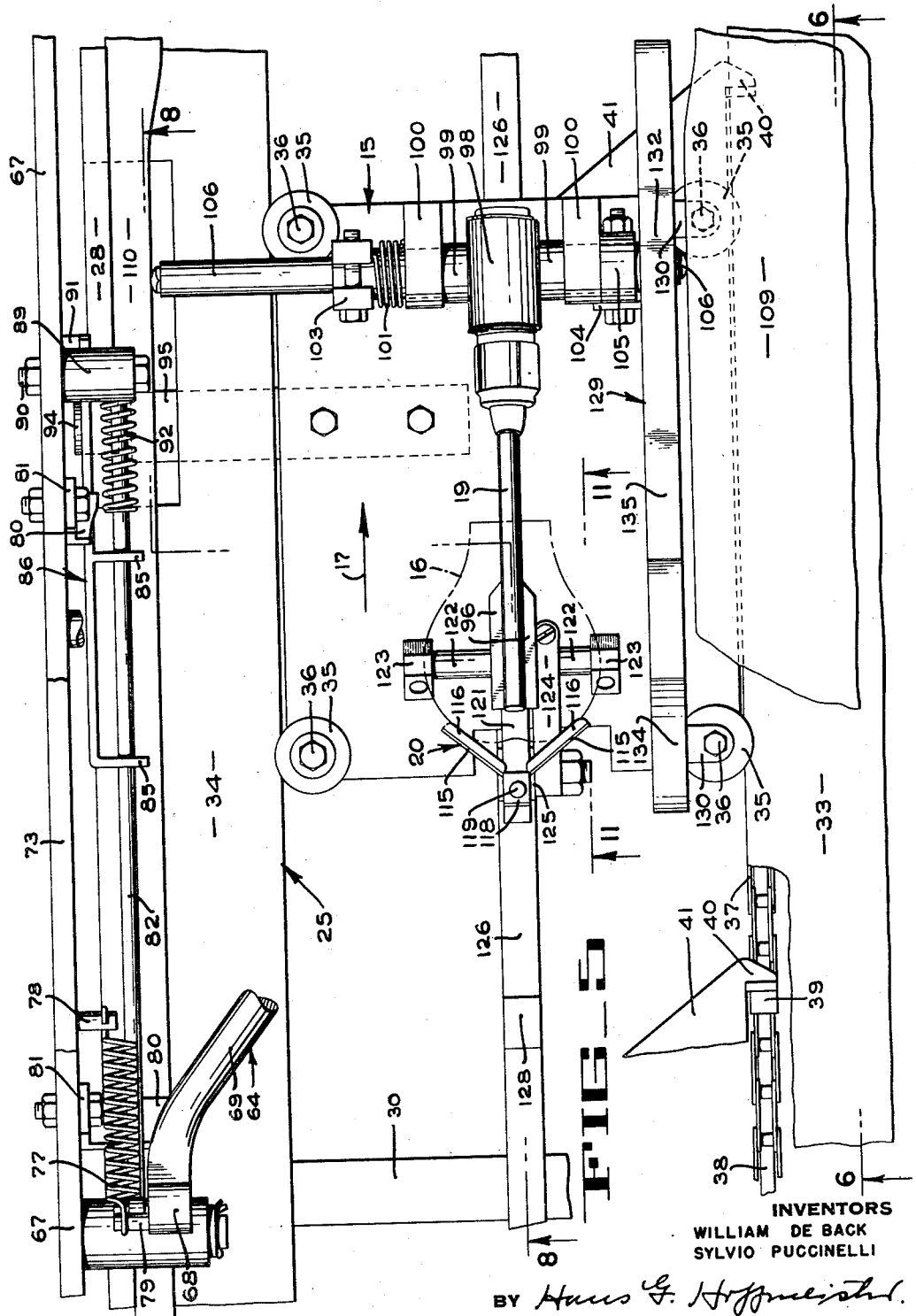

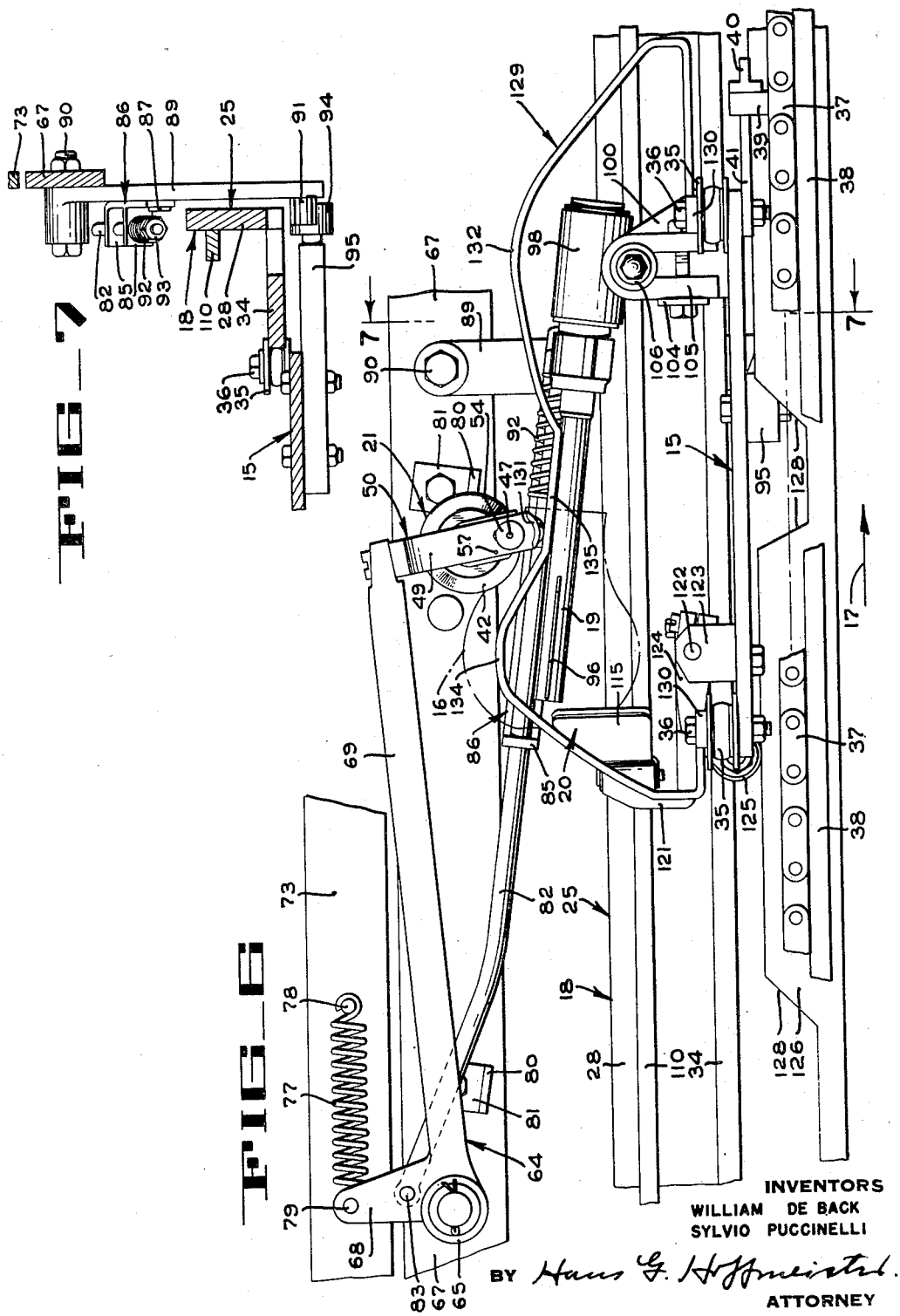

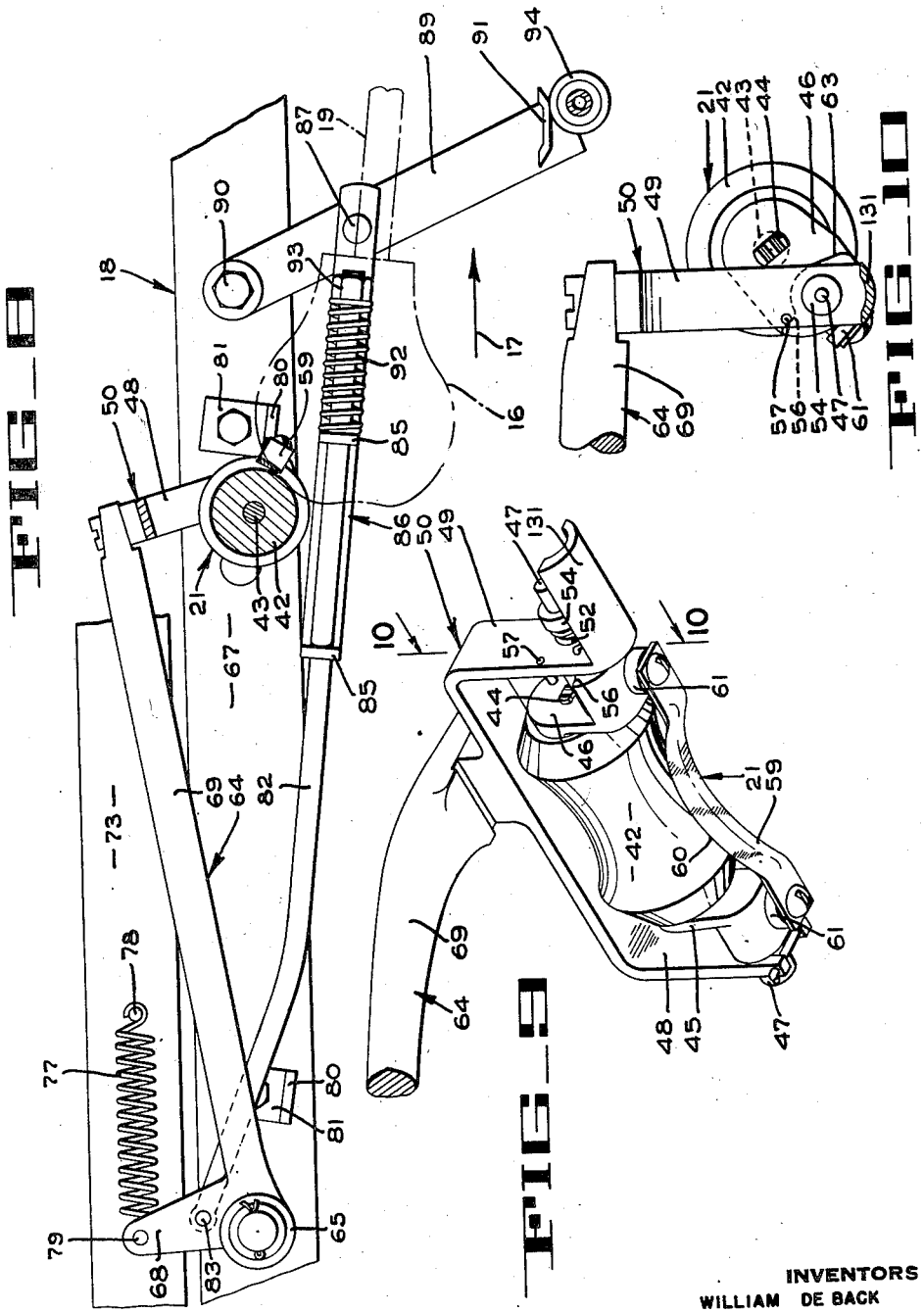

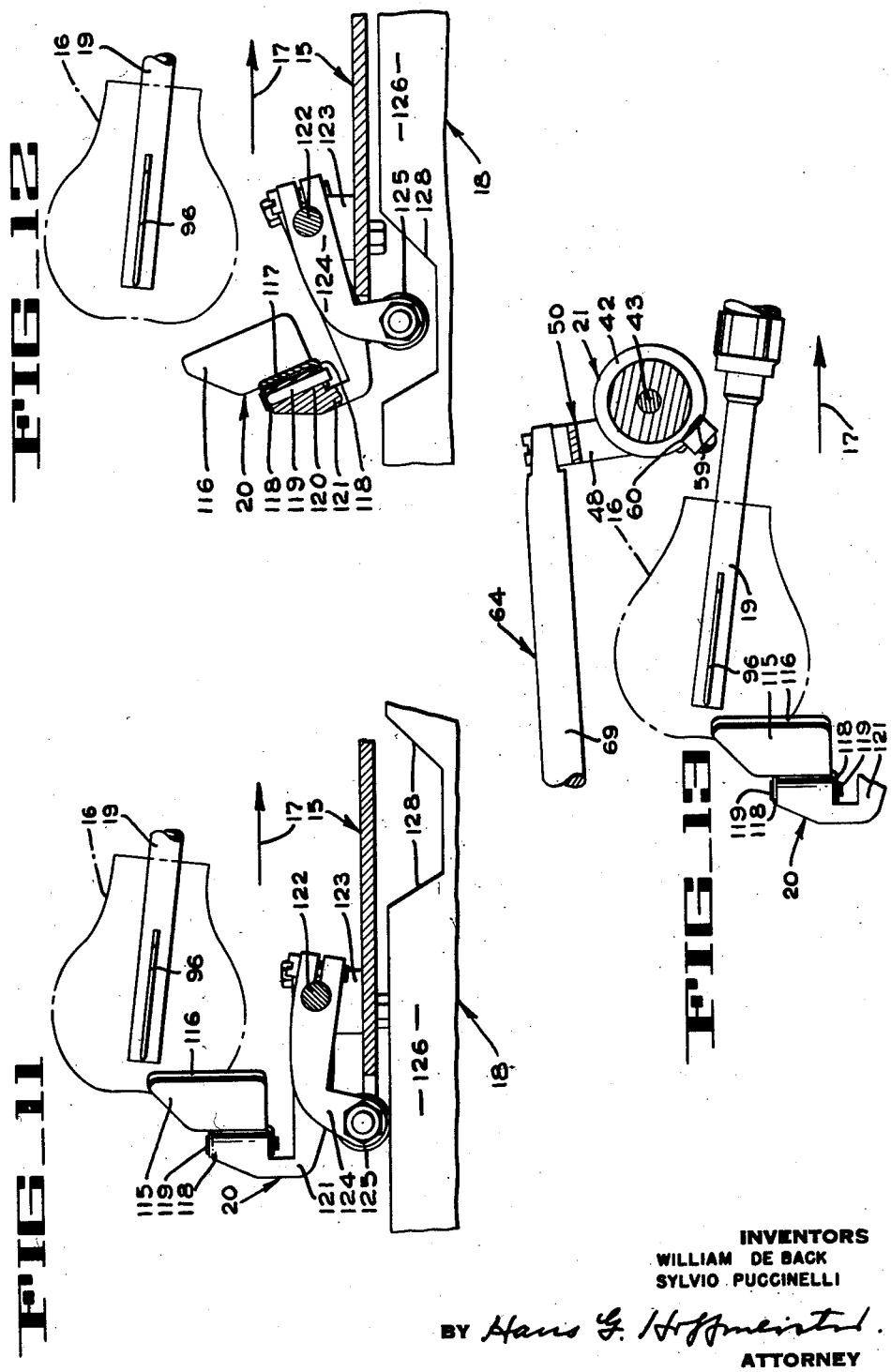

United States Patent Office 2,789,603
Patented Apr. 23, 1957

2,789,603

FRUIT PREPARATION MACHINE

William de Back, St. Nicolas-Waes, Belgium, and Sylvio Puccinelli, San Jose, Calif., assignors to Food Machinery and Chemical Corporation, San Jose, Calif., a corporation of Delaware Application June 10, 1955, Serial No. 514,620

7 Claims. (Cl. 146—43)

This invention pertains to improvements in machinery for processing fruit and more particularly relates to an improved machine for peeling fruit, such as pears and the like.

In pear peeling machines of the type in which a cutting blade is moved in a straight line along the length of the pear in cutting contact with only one side thereof, it is particularly difficult to provide support which is adequate to counteract the pressure of the cutter assembly and which will, at the same time, permit easy adjustment of the position of the pear during subsequent peeling operations. Additionally, in straight line peelers, it is difficult to maintain the longitudinally moving cutter in cutting contact with the steeply inclined surface of the blossom or butt end of the pear.

Accordingly, it is an object of the present invention to provide an efficient pear support means for a straight line pear peeling machine.

Another object is to provide means for maintaining the cutter head of a straight line pear peeling machine in cutting contact with the pear as the cutter head traverses the blossom or butt end of the pear.

Another object is to provide means for automatically positioning a support member under a pear being peeled and removing said support member from under the pear, in coordination with consecutive peeling strokes of a straight line pear peeler.

Other and further objects and advantages of the present invention will become apparent from the following description taken in connection with the accompanying drawings.

Fig. 1 is a fragmentary plan of a pear peeling machine constructed in accordance with the teachings of the present invention.

Fig. 2 is a fragmentary side elevation of the machine of Fig. 1.

Fig. 3 is a fragmentary perspective of a portion of the machine of Fig. 1 taken along line 3—3 of Fig. 1.

Fig. 4 is a fragmentary vertical section taken on lines 4—4 of Fig. 3.

Fig. 5 is an enlarged plan view, with parts broken away, of a portion of the present pear peeling machine, taken along lines 5—5 of Fig. 2.

Fig. 6 is a fragmentary side elevation, with parts broken away, taken along lines 6—6 of Fig. 5.

Fig. 7 is a fragmentary vertical section taken along lines 7—7 of Fig. 6.

Fig. 8 is a fragmentary vertical section taken along lines 8—8 of Fig. 5, particularly showing the position of the knife control mechanism as the knife moves over the butt end of the pear.

Fig. 9 is a fragmentary perspective of the cutter assembly used with the pear peeling machine of the present invention.

Fig. 10 is a vertical section taken on lines 10—10 of Fig. 9, showing the cutter head in an initial rotated position.

Fig. 11 is a fragmentary vertical section taken on lines 11—11 of Fig. 5.

Fig. 12 is a fragmentary vertical section taken along lines 11—11 of Fig. 5, with parts broken away.

Fig. 13 is a fragmentary vertical section taken along lines 11—11 of Fig. 5, particularly showing the relationship of the cutter and the pear at the beginning of a peeling stroke.

In Figs. 2 and 3 the reference numeral 15 indicates a carriage on which a fruit 16, such as a pear, is transported in the direction indicated by arrow 17 along a support structure 18 with the stem-blossom axis of the pear disposed in a substantially horizontal plane. The pear is impaled on a support rod or tube 19 and is supported by a butt clamp 20 (Fig. 2) which is pivotally mounted on the carriage 15. As the pear is carried along the structure 18, it passes under a plurality of consecutive cutters 21, each of which contacts the pear at its stem end and slices a longitudinal strip of peel from the surface of the pear, the strip extending from the stem end to the blossom end of the pear. In order that each cutter 21 will contact an unpeeled portion of the pear, the support tube is indexed angularly about its axis immediately after the pear passes each cutter. It will be understood that a sufficient number of cutters 21 is provided so that the cuts will overlap and the skin will be removed from the entire surface of each pear during one complete angular indexing of the pear.

The support structure 18 comprises a pair of spaced, longitudinally extending side frame members 24 and 25 (Fig. 1), each side frame member consisting of a plurality of upright posts 27 to the upper end of which is secured a longitudinally extending, upright rigid bar 28. The side frames 24 and 25 are secured together in mutual bracing relation by transverse straps 30.

To provide tracks for the carriage 15, oppositely disposed flat bars 33 and 34 (Fig. 3) are secured, as by welding, to the inner faces of the longitudinal bars 28. Two grooved wheels 35 are rotatably mounted by pins 36 on each side of the carriage 15, the groove of each wheel being adapted to receive the edge of one of the tracks 33 or 34 in rolling engagement. Each carriage 15 is propelled along the support structure 18 by a continuously driven endless chain 37 which is mounted on the support structure 18 in a conventional manner and has its upper run supported in sliding relation on a flat support member 38 mounted on the frame member 30 immediately below and parallel to the track 33. The chain 37 is provided with spaced upstanding drive lugs 39, each of which is arranged to drivingly engage an arm 40 which overlies the chain 37 and which is integrally formed on a bracket 41 fixedly secured to the forward portion of each carriage 15. In this manner, the continuously moving chain 37 may simultaneously advance a plurality of carriages 15 one after the other past the aligned cutters 21.

The spaced tracks 33 and 34, which support the carriages, may be flat throughout their length so that each carriage with an unpeeled pear thereon may be bodily placed on the tracks at one end of the machine, as at the left end of Fig. 2, and removed at the opposite end after the pear has been peeled. If desired, the tracks 33 and 34 may be formed as a closed circuit around which the carriages are continuously moved. It will be evident that, with a circuitous arrangement, the curved portions of the tracks 33 and 34 must have a curvature sufficiently large to accommodate the carriage 15.

Each cutter 21 includes a concave guide roller 42 (Fig. 9) that is rotatably mounted on a shaft 43 which has flattened end portions 44 (Fig. 10) secured, as by swaging, in openings in the outer ends of two spaced roller support arms 45 and 46 (Fig. 9). Each support arm carries a stub shaft 47 which is rotatably journaled in one of two arms 48 and 49 of a yoke 50. The guide roller 42 is, therefore, freely rotatable about its own axis on the shaft 43 and is rotatable as a unit with the spaced arms 45 and 46 about the axis of the aligned stub shafts 47. A torsion spring 52 is anchored at one end in a hole in the yoke arm 49 and at the other end in a collar 54 adjustably secured to one of the aligned stub shafts 47. The torsion spring 52 tends to rotate the shaft 47 in a clockwise direction (Fig. 10) and to pivot the guide roller 42 and the two arms 45 and 46 as a unit toward the position shown in Fig. 10 which is the position the roller assumes before each cutting stroke of the knife and is defined by the abutment of a shoulder 56 formed on the arm 46 with a pin 57 projecting from the yoke arm 49. A peeling knife 59 (Fig. 9), having a cutting edge 60, extends transversely of the yoke 50 and is secured at each end to bosses 61 formed on the arms 45 and 46. The intermediate portion of the knife is arcuate in shape so as to conform to the contour of the concave guide roller 42. The guide roller 42 gauges the depth of the cut taken by the knife 59 and steers or turns the knife to follow closely the irregular contour of the fruit. As the roller 42 traverses the surface of the pear, the knife is pivoted from the position of Fig. 10 in a counterclockwise direction against the resistance of the torsion spring 52 until a shoulder 63 formed on the arm 46 abuts the stop pin 57.

Each cutter 21 is supported in position over the moving carriages 15 by means of a bellcrank 64 (Fig. 6) which has a hub 65 pivotally mounted on an elongated support bar 67. The bellcrank has a short arm 68 and a long arm 69 which is arranged to hold the yoke 50 of the cutter in fixed, depending relation. As best seen in Fig. 2, the bar 67 extends longitudinally of the support frame 18 and is supported from the frame 18 by a plurality of spaced vertical posts 72. An upper support bar 73 is adjustably mounted longitudinally of the machine immediately above the bar 67 by means of a plurality of bolts 74 each of which extends through an opening in the vertical bar 72 and through a slot 75 in the upper support bar 73. The bellcrank 64 (Fig. 6) is urged in a clockwise pivoting direction by a tension spring 77, which is anchored at one end on a pin 78 projecting from the upper support bar 73 and is anchored at the other end on a pin 79 projecting from the outer end of the short arm 68 of the bellcrank 64. Clockwise pivoting movement of the bellcrank 64 is limited by a ledge 80 formed on an angle member 81 which projects inwardly from the support bar 67.

As seen in Fig. 8, when the cutter 21 moves over the butt end of a pear, it must move a considerable distance downward at the same time that it moves longitudinally of the pear. To maintain the cutter against the pear as it moves over the butt end of the pear, an additional force must be applied to the bellcrank tending to swing the cutter rapidly downwardly along the butt of the pear. A feature of the present invention is the arrangement for applying this additional force to the cutter. In accordance with this invention a rod 82 is pivotally connected by a pin 83 to the arm 68 of the bellcrank 64. The rod 82 is slidably journaled in two spaced bearing members 85 that are formed in spaced relation on a link 86 which is pivotally connected by a pin 87 to a cam lever 89. At its upper end the cam lever 89 is pivotally mounted on the support bar 67 by a bolt 90. At its lower end the lever 89 carries a shoe 91. A spring 92 is disposed on the rod 82 between one of the bearings 85 and a nut 93, that is threaded on the end of the rod. When the cam lever 89 is swung in a counterclockwise direction (Fig. 8), the link 86 is moved toward the right to exert a pull on the rod 82 through the spring 92. To apply the above-mentioned additional force to the bellcrank as the cutter starts down the butt end of the pear, the cam lever 89 is swung in a counterclockwise direction by a roller 94 (Figs. 7 and 8) that is rotatably mounted on a bar 95 secured to the bottom of the carriage 15. The bar 95 projects laterally from the carriage 15 and is so located thereon that it contacts the shoe 91 of the cam lever 89 just as the cutter starts down the butt end of the pear.

Since each carriage 15 is provided with a roller 94, the lever 89 and the bellcrank 64 will be pivoted each time a carriage passes therebeneath. Thus, each cutter 21 will be subjected to a predetermined supplemental pressure as it moves downwardly along the butt end of the pear.

As previously mentioned, during the peeling operation the pear is impaled on a stemming tube 19 (Fig. 5) which is provided with fins 96 on one end and is secured at the other end to a pinion 97 (Fig. 4) that is rotatably journaled in a cylindrical housing 98 integrally formed transversely on a sleeve 99. The sleeve 99 is rotatably journaled in spaced bearing blocks 100 which are rigidly secured to the upper surface of the carriage 15. A torsion spring 101, connected between a clamp 103 on sleeve 99 and one of the bearing blocks 100 holds the stemming tube in a predetermined position, wherein a circular stop plate 104, which is secured to a clamp 105, abuts the side of the other bearing block 100, as shown in Fig. 5. Journaled within the sleeve 99, and arranged to slide axially therein, is a rod 106 having a circular rack 107 formed thereon, the teeth of the rack being arranged to mesh with teeth 108 of the pinion 97. It will be evident that, as the rod 106 is shifted from left to right, or vice versa, the pinion 97 and the attached stemming tube will be angularly indexed, about the axis of the pinion, a number of degrees proportional to the amount of lateral shifting of the rod 106. The lateral disposition of the rod 106 is controlled by two longitudinally extending, horizontally disposed cam plates 109 and 110 (Figs. 3 and 1) which have camming edges against which the opposite ends of the rod 106 abut. Each cam plate has a plurality of straight camming edge portions 113, 113a, 113b, 113c and 113d connected by slanted transition portions 114. The edge portions 113, 113a, 113b, 113c and 113d on one cam plate are of the same longitudinal extent and are directly opposite corresponding edge portions on the other cam plate and cooperate therewith to determine the lateral position of the rod 106. As seen in Fig. 1, at the left-hand end of the machine the edges 113, 113 hold the rod 106 in a limiting position at one side of the machine. As the carriage 15 travels toward the right, the rod 106 will be shifted step by step transversely of the frame until the camming edges 113d, 113d are reached. At this point the rod 106 has reached the limiting position at the opposite side of the machine and the intermittent angular indexing movements of the stemming tube and the pear thereon will be completed. It will be understood that the number of angular indexing movements of the stemming tube are so coordinated with the width of each strip of peel severed by the rotary cutter that the entire surface of the pear is peeled while the pear is rotated one complete revolution.

When a strip of peel is being cut from the pear, the pear is supported jointly by the stemming tube 19 and by the butt clamp 20 (Fig. 11). The butt clamp 20 has two wings 115 each of which has a sponge rubber pear-contacting pad 116 (Fig. 12) secured thereto. The clamp 20 also has an integrally formed rear strap 117 (Fig. 12) with outwardly projecting upper and lower ears 118 which are apertured to receive a pivot pin 119. The pin 119 extends through the ears 118 and through an elongated opening 120 in one end of an L-shaped arm 121, the other end of which is keyed to a shaft 122 that is journaled in two spaced posts 123 that project upwardly from the carriage 15. The butt clamp 20 is arranged for movement between the raised pear-supporting position of Fig. 11 to the lowered position of Fig. 12, by means of a control arm 124 that is keyed to the shaft 122 and carries a roller follower 125 which is arranged to ride along the top surface of a cam track 126. The track 126 has a plurality of depressions 128 spaced along its length.

When the roller 125 drops into a depression, the butt clamp is lowered to the position of Fig. 12. The depressions 128 are so arranged that, as seen in Fig. 6, the butt clamp will be lowered immediately after one of the cutters 21 has completed its cutting stroke. When the butt clamp is lowered away from the pear, there is no resistance to the rotary indexing of the paper, and accordingly the locations of the depressions 128 are coordinated with the locations of the transition portions 114 of the cam plates 109 and 110 so that the rotary indexing of the pear takes place while the butt clamp is in lowered position.

At the beginning of each cutting stroke it is necessary that the cutter 21 be disposed in a position in which the guide roller 42 may readily engage the stem end of the pear. For this purpose the carriage 15 is provided with a track 129 (Fig. 3) in the form of a curved strap of metal extending longitudinally of the carriage. At its forward and rear ends, the track 129 has integrally formed eye connections 130 through which the axle pins 36 of the wheels 35 extend. The track 129 is arranged to be contacted by a curved follower shoe 131 which is formed on the end of the arm 49 of the cutter yoke 50. It will be noted in Fig. 6 that the track is provided with a portion 132 which lifts the cutter clear of the stemming tube housing and a portion 134 which lifts the cutter clear of the free end of the stemming tube if no pear is impaled thereon. An intermediate guide portion 135 positions the cutter so that the guide roller 42 is in position to ride up the stem end of a pear impaled on the stemming tube. It will be understood that, before the pear is impaled on the stemming tube, the stem end of the pear is cut off so that the remaining portion has a predetermined diameter.

The machine of the present invention is put into operation by starting the power unit (not shown) that drives the endless chain 37. Each upstanding lug 39 on the chain 37 will drivingly engage the arm 40 of a carriage bracket 41 to propel the carriage forwardly in the direction of arrow 17 along the support structure 18. The operator is stationed at a loading point which may be located at the left hand end of the machine of Figs. 1 and 2. As each carriage passes, the operator impales a pear on the stemming tube 19 and the pear is then carried toward the right under the consecutive cutters 21.

As each pear approaches a cutter, the follower shoe 131 (Fig. 6) of the cutter contacts the guide track 129 so that the cutter is first raised over the stemming tube housing 102 and then, when the shoe 131 rides along the guide surface 135, the cutter is positioned in a predetermined desirable position relative to the stem end of the pear. In this position the guide roller 42 and the cutting blade 59 can advantageously engage the pear and begin to slice a longitudinal peel therefrom.

As the blade 59 traverses the pear from the stem end to the blossom end, the spring 77 exerts a continuous pull on the bellcrank 64 to maintain the roller 42 in contact with the pear. As the roller 42 starts down the butt end of the pear, the bellcrank is swung in a clockwise direction by the engagement of the cam lever 89 with the roller 94 that is carried by the carriage 15. This supplemental pivoting movement of the bellcrank causes the cutter to quickly pass down the butt end of the pear and complete the longitudinal cut. The bracket 81 (Fig. 6) stops the downward movement of the cutter when it approaches the center of the butt end.

Immediately after the pear passes from under the cutter, the roller follower 125 of the butt clamp assembly drops into a depression 128 in the cam track 126 causing the butt clamp to be lowered out of contact with the pear. When the clamp is clear of the pear, the stemming tube 19 is indexed to present an unpeeled surface to the next cutter. When the indexing is completed, the roller follower 125 rides out of the depression 128 and raises the butt clamp into contact with the pear.

From the foregoing description it will be seen that this invention provides a novel means for peeling a fruit while it is continuously moved along a straight line path. The use of a supplemental means to move the cutter rapidly down the butt end of the pear permits the pear to be advanced at a constant linear speed while assuring positive, complete cutting of the peel.

While the machine of the present invention is particularly adapted for use in peeling pears, it is evident that many other types of fruit could be efficiently peeled in this machine. It will be understood that modifications and variations of the embodiment of the invention disclosed herein may be resorted to without departing from the scope of the novel concepts of the invention.

Having thus described our invention, what we claim as new and desire to protect by Letters Patent is:

1. A machine for peeling pears or the like comprising a carriage movable along a straight line path, means for mounting a pear on said carriage with the stem-blossom axis of the pear substantially parallel to said path, a support member adjacent said path, a bellcrank mounted on said support member for pivoting movement on an axis substantially transverse to said path, said bellcrank having one arm extending over said path, a cutter mounted on said one arm for movement across said path, means for positioning said cutter in a predetermined position relative to the surface of a pear mounted on said carriage, a tension spring connected between the other arm of said bellcrank and said support member and arranged to pivot said bellcrank in a predetermined direction to urge said cutter against a pear being advanced on said carriage, a butt support pivotally mounted on said carriage, and camming means disposed in fixed position relative to said support member and operatively associated with said butt support for holding said butt support in supporting contact with the pear on said carriage while said cutter traverses said pair and for permitting said butt support to move out of pear supporting position when the pear passes from under said cutter.

2. A pear peeling machine comprising a carriage movable along a straight line path, means for mounting a pair on said carriage with the stem-blossom axis of the pear substantially parallel to said path, a cutter yieldably mounted above said path, guide means for positioning said cutter in the path of the stem end of the pear to engage said stem end and start a lengthwise peeling cut as the pear moves under the yieldable cutter, resilient means continuously biasing said cutter into peeling contact with the pear as said cutter traverses the length of the pear, a support member mounted on said carriage in vertical alignment with said cutter and arranged to engage and support a pear held on said mounting means when said cutter is in peeling contact with the pear, and means operatively connected between said cutter and said carriage for moving said cutter a predetermined distance toward the center of the butt end of the pear as said cutter moves over the butt end.

3. A machine for peeling pears or the like comprising a carriage mounted for movement along a straight line path, a support rod having one end secured to said carriage and having a free end adapted to receive a pear in supporting relation with the stem-blossom axis of the pear substantially parallel to the path of movement of the pear, a cutter mounted above said path of movement and having a cutting edge extending into contact with the pear to slice a longitudinal strip of peel therefrom as said cutter traverses the length of the pear, a butt support member pivotally mounted on said carriage below the free end of said support rod, cam means operatively associated with said butt support member and coordinated with the position of said cutter for raising said butt support member into supporting contact with the pear as said cutter slices a peel therefrom.

4. A machine for peeling pears or the like comprising a carriage mounted for movement along a straight line path, a support tube mounted adjacent one end on said carriage and adapted to receive a pear on its free end with the stem-blossom axis of the pear substantially parallel to the path of movement of the pear, a butt support member pivotally mounted on said carriage below the free end of said support tube, a fixed cam track mounted below the path of movement of the carriage, and a cam follower on said butt support member and in engagement with the camming surface of said cam track, said camming surface being arranged to pivot said butt support member upwardly into supporting contact with a pear on the free end of said tube as said carriage moves along a predetermined portion of said path and to permit said butt support member to move out of pear-supporting position when said predetermined portion of the path has been traversed.

5. A machine for peeling pears or the like comprising a carriage mounted for movement along a straight line path, a rod pivotally mounted on said carriage and having a free end adapted to impale a pear along its longitudinal axis, a butt clamp mounted on said carriage below the pear impaling portion of said rod, said clamp having self-adjusting pivotally mounted pear-contacting support members, means for holding said clamp in contact with a pear impaled on said rod, and cutter means extending into the path of movement of a pear supported in said butt clamp to slice a peel therefrom.

6. A machine for peeling pears or the like comprising a carriage mounted for movement along a straight line path, a rotatable support member mounted on said carriage and adapted to support a pear for rotational movement about its longitudinal axis, a butt clamp pivotally mounted on said carriage directly below the pear-supporting portion of said rotatable member, a fixed cam disposed below the path of movement of said carriage, means on said butt clamp and operatively associated with said fixed cam for pivoting said butt clamp upwardly into supporting relation with said pear and for permitting said butt clamp to pivot downwardly out of pear supporting position, and second cam means operatively associated with said rotatable member for rotating the same and coordinated with said fixed cam to rotate said rotatable support member when said butt clamp is in lowered position removed from supporting engagement with the pear.

7. A machine for peeling a pear or the like comprising a carriage mounted for movement along a straight line path, a rotatable support rod mounted on said carriage and having a free end adapted to impale a pear along its longitudinal axis, a butt support clamp pivotally mounted on said carriage directly below the pear-impaling portion of said rod, a cam follower carried by said butt clamp, a fixed cam disposed below the path of movement of said carriage and having a camming surface engaging said cam follower to alternately raise said butt clamp into supporting engagement with a pear on said rod and lower said clamp away from pear-supporting position, a support structure adjacent the path of movement of said carriage, a cutter pivotally mounted on said support structure and disposed above the pear on said rod, a cam lever pivotally mounted on said support structure, a linkage pivotally connecting said cam lever to said cutter so that pivoting of said lever in a predetermined direction causes downward swinging movement of said cutter toward the pear on said support rod, a roller carried by said carriage and arranged to engage said cam lever to pivot said lever in said predetermined direction, and stationary cam means carried by said support structure and operatively associated with said rotatable support rod to rotate the rod in fixed increments, said fixed butt clamp cam, said cam lever actuating roller, and said stationary cam means having camming surfaces positioned in coordinated relation with each other whereby to consecutively raise said butt clamp to pear-supporting position, swing said cutter downwardly toward the pear, lower said butt clamp away from the pear, and rotate the pear holder while said butt clamp is in lowered position.

References Cited in the file of this patent

UNITED STATES PATENTS

| | | |
|---|---|---|
| 1,837,335 | Reinstein et al. | Dec. 22, 1931 |
| 1,973,996 | Reinstein | Sept. 18, 1934 |
| 2,139,704 | Thompson et al. | Dec. 13, 1938 |
| 2,699,191 | De Back et al. | Jan. 11, 1955 |